June 28, 1960  D. W. FATH  2,943,161
MOTOR OPERATED SWITCH
Filed Jan. 23, 1959   5 Sheets-Sheet 1

INVENTOR.
DOUGLAS W. FATH
BY H R Rather
ATTORNEY

June 28, 1960   D. W. FATH   2,943,161
MOTOR OPERATED SWITCH
Filed Jan. 23, 1959   5 Sheets-Sheet 3

INVENTOR.
DOUGLAS W. FATH
BY H R Rather
ATTORNEY

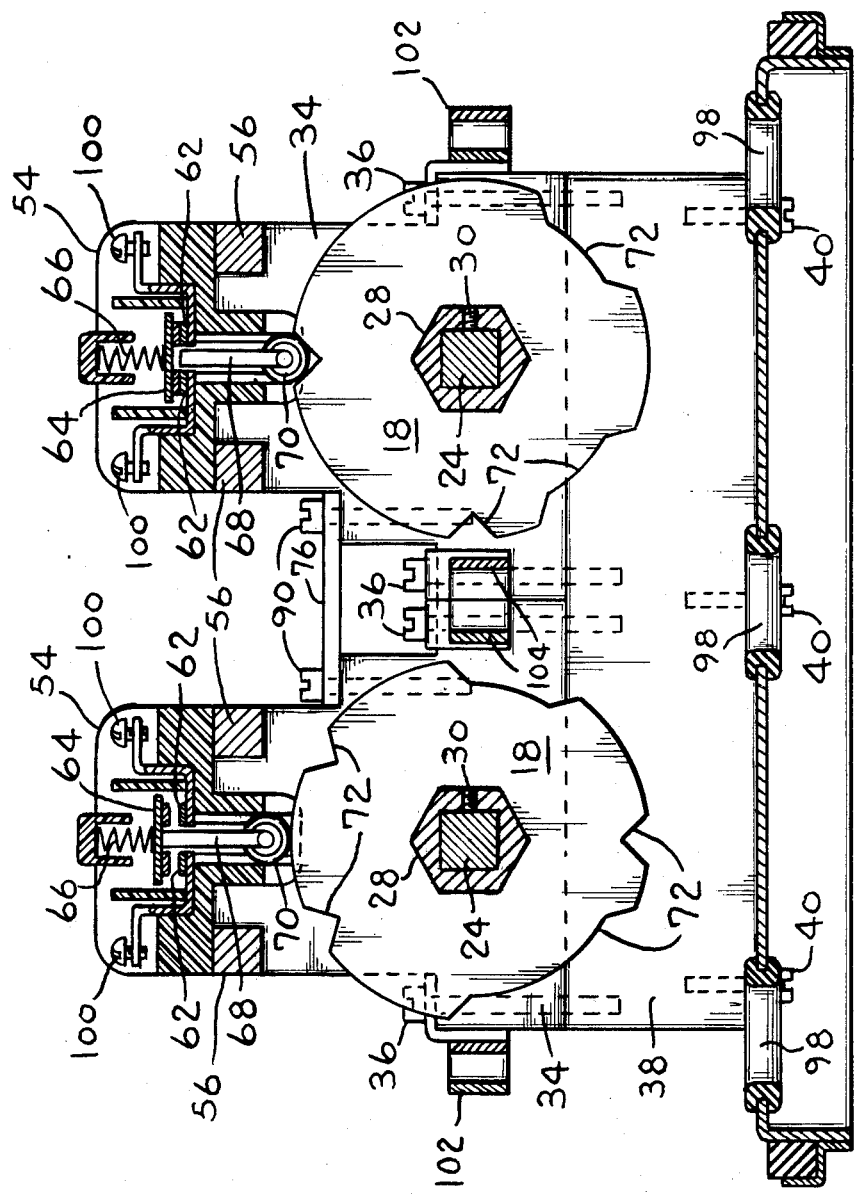

INVENTOR.
DOUGLAS W. FATH
BY
ATTORNEY

United States Patent Office 2,943,161
Patented June 28, 1960

2,943,161
MOTOR OPERATED SWITCH

Douglas W. Fath, Brookfield, Wis., assignor to Cutler-Hammer, Inc., Milwaukee, Wis., a corporation of Delaware Filed Jan. 23, 1959, Ser. No. 788,553

4 Claims. (Cl. 200—38)

This invention relates to motor driven program switches which are used, for example, in the automatic charging controller of a blast furnace. When so used they operate in the skip hoist program, small bell program, large bell program, load summary program, and distributor angle program. Their function is to initiate all operations and checks of such programs to see that each operation has progressed satisfactorily before initiating any new operation.

It is an object of this invention to provide a switch of this type which accurately correlates the opening and closing of a large number of circuits by a compact arrangement of its component parts which can be quickly and easily disassembled in units to permit adjustment and replacement of such parts.

Another object is to provide a switch of this type which will not drift, is relatively inexpensive to manufacture and install and which meets the test requirements of the rugged use to which it is put.

These objects are attained by a motor operated switch comprising a base having four banks of cams and four banks of switches actuated by such cams mounted thereon. The banks of cams and switches are arranged in two parallel rows, two banks in a row, with the cam shafts of the two banks in each row in axial alignment and coupled to each other. A power unit which includes an electric motor is mounted between the rows of cams centrally thereof. The motor drive shaft extends between the two rows of aligned cam shafts substantially normal to the plane thereof. A helical gear is mounted on the motor drive shaft in driving engagement with a pair of helical gears mounted on one of the cam shafts in each of the parallel rows to drive all four banks of cams together. The power unit, switch banks and cam banks can be readily removed and replaced as units for replacement, adjustment, etc.

Other objects and advantages will be pointed out in, or be apparent from the specification and claims as will obvious modifications of the single embodiment shown in the drawings, in which:

Fig. 4 is a vertical sectional view taken along line 4—4 of Fig. 3;

Figure 1:
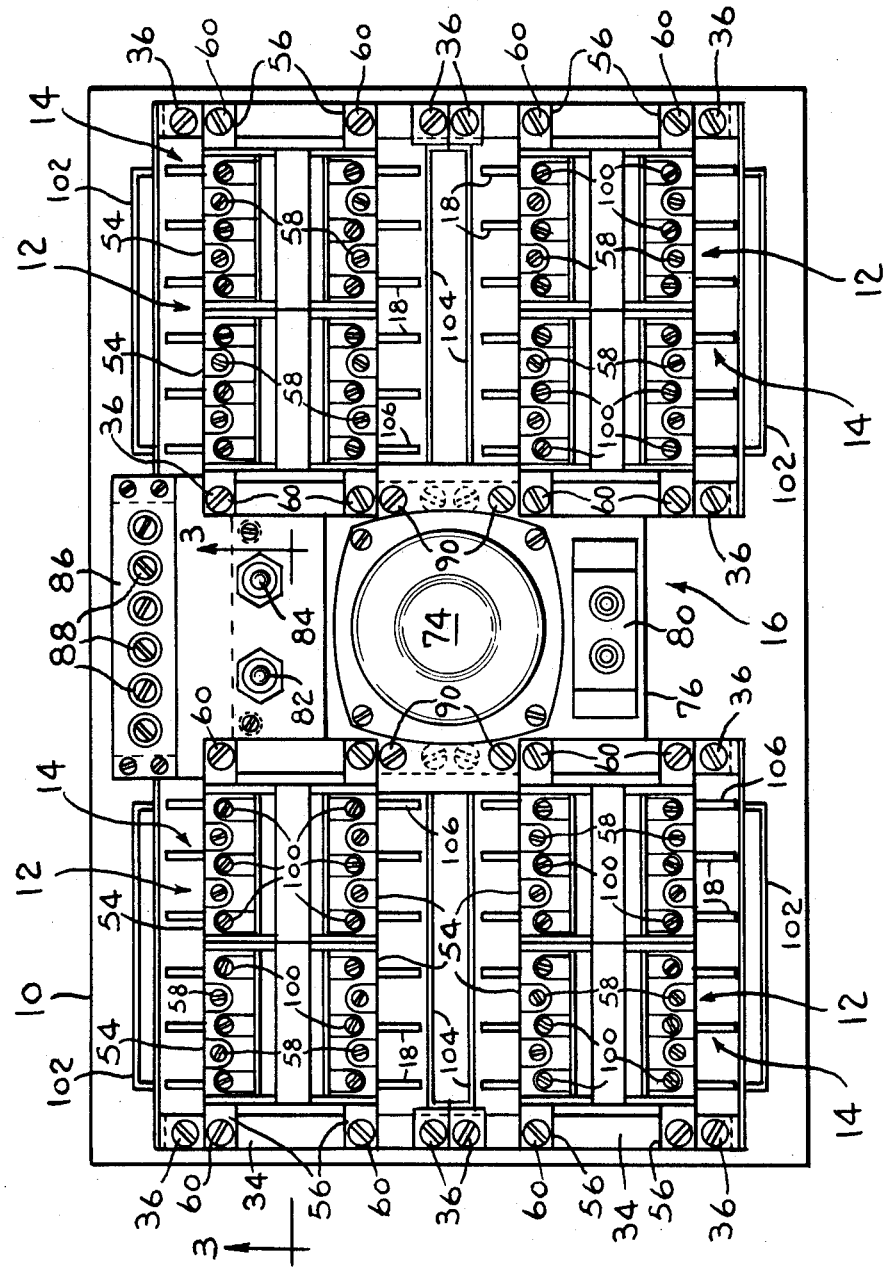
Fig. 1 is a top plan view of a program switch embodying the invention.
Figure 2:
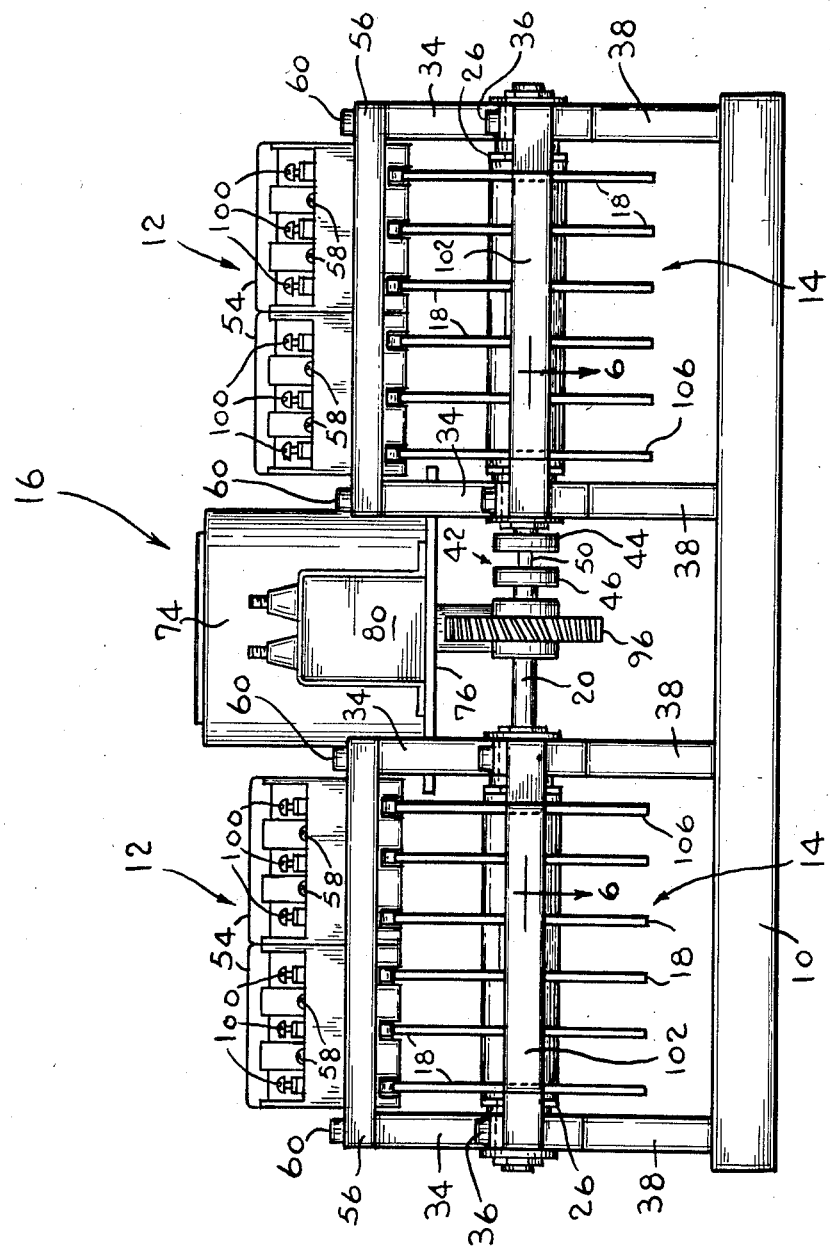
Fig. 2 is a view in side elevation of the switch shown in Fig. 1.

Referring to the drawings, the program switch of this invention (Fig. 1) includes a base 10 on which are mounted four separate banks of switches 12 actuated by four banks of cams 14 which, in turn, are driven by a power unit 16. A suitable cover (not shown) having a top and depending sides which fit against base 10 is provided to completely enclose the operating mechanism of the device.

Each cam bank 14 includes a plurality of disc cams 18 mounted on a cam shaft 20 and spaced from each other by spacer rings 22. Disc cams 18 of cam banks 14 have square openings therein for rotatable engagement with the square central portions 24 of cam shafts 20. The cams are held securely on the shafts between spacer rings 22 by means of collars 26 threaded on the ends of each shaft. One spacer ring 28 on each shaft (preferably the center ring) is made with a square opening and a hexagonal (or square) outside configuration. To assemble a bank of cams, a spacer ring 28 is fitted on the shaft and drilled for installation of a pin 30. The square opening in ring 28 prevents cocking of the ring on the square shaft during the drilling operation to facilitate the proper mounting of the cams. With ring 28 fixed to the shaft in the proper place cams and spacers are assembled from each end of the shaft and securely held between collars 26. The assembly can be held against rotation for installation and removal of collars 26 by a wrench fitted on spacer ring 28.

Cam shaft 20 of each cam bank is journaled in bushings 32 mounted in a pair of spaced mounting blocks 34. The four cam banks are detachably mounted on base 10 in two parallel rows with the cam shafts 20 in each row positioned in axial alignment with each other. Each pair of mounting blocks 32 in which a cam shaft 20 is rotatably mounted are detachably mounted by four machine screws 36 on support bars 38 which project from base 10 and are fastened thereto by screws 40 as shown in Fig. 4.

Figures 7, 8:
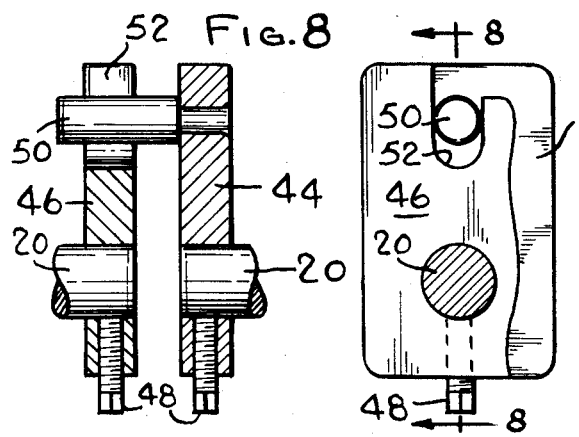
Fig. 7 is a fragmentary sectional view taken along line 7—7 of Fig. 6.
Fig. 8 is a fragmentary sectional view taken along line 8—8 of Fig. 7.

Each pair of aligned cam shafts 20 are coupled together by a coupling 42 consisting of members 44 and 46 fixed on the inner end portions of shafts 20 by set screws 48. As shown in Figs. 7 and 8, member 44 has a pin 50 projecting from one face thereof for engagement with a slot 52 in member 46 to effectively couple the two shafts together when cam banks 14 are mounted in assembled position on the base.

Each switch bank 12 includes a plurality of switch units 54 mounted in a row between a pair of mounting bars 56 by machine screws 58. The assembled switch bank is mounted as a unit over a cam bank 14 by four screws 60 passing through the ends of bars 56 and screwed into mounting blocks 34 of each cam bank.

Figure 3:
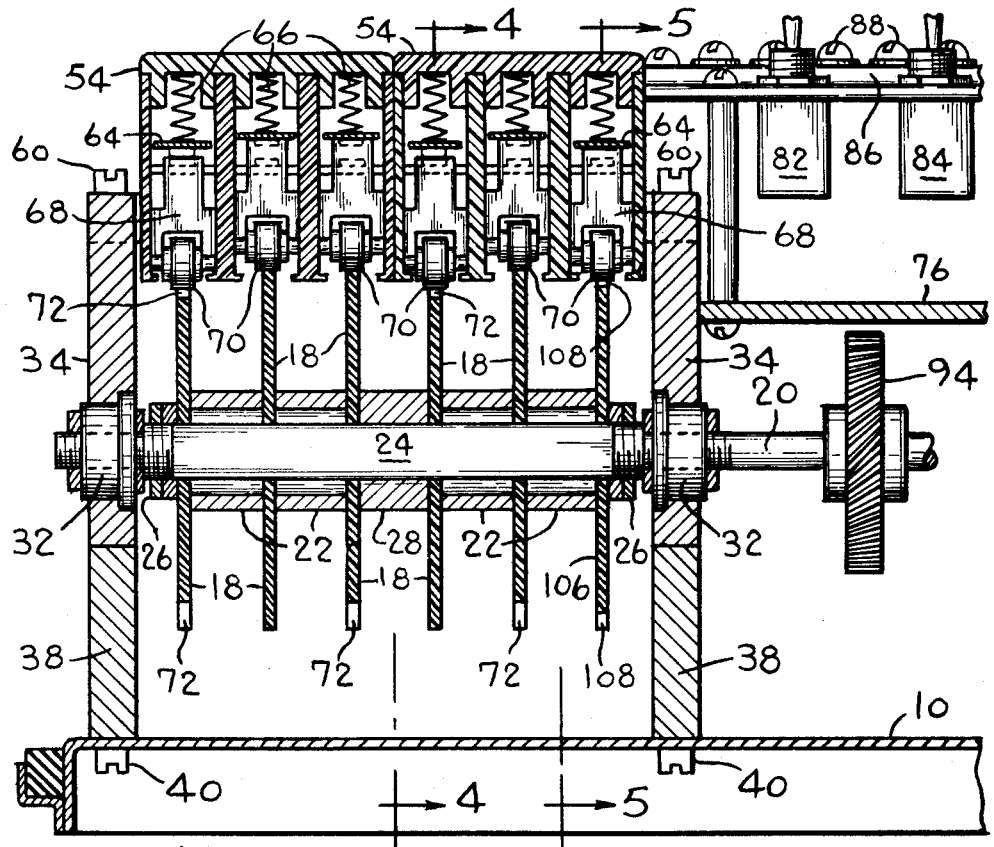
Fig. 3 is a vertical sectional view taken along line 3—3 of Fig. 1.

Switch units 54 may be of any suitable construction with each unit shown in the drawings (Figs. 3 and 4) having three switches comprising a pair of stationary contacts 62 and a movable bridging contactor 64 actuated against the bias of a return spring 66 by an actuator plunger 68 having a roller 70 mounted at one end for engagement with the periphery of a disc cam 18. Cams 18 have cut-out portions 72 of varying angular extent in the periphery thereof to actuate the movable contactors 64 of the switches in any desired sequence as rollers 70 on plungers 68 ride in and out such cut-out portions.

Power unit 16 for driving the cam banks includes an electric motor 74 fastened to a mounting plate 76 with its drive shaft 78 extending through such plate between cam shafts 20. The motor is of the induction type with built-in dynamic braking and a capacitor 80 connected in series with the shading coil winding of the motor to improve the torque characteristics thereof. Manual operation for testing, forward stepping, and reset is accomplished by toggle switches 82 and 84 mounted on plate 76. The necessary electrical connections are made to motor 74 and switches 82 and 84 through a terminal plate 86 having terminals 88 mounted on motor mounting plate 76. Mounting plate 76 which carries motor 74, capacitor 80, switches 82 and 84, and terminal plate 86 is detachably mounted on the four inner mounting blocks 34 by four machine screws 90.

Figure 6:
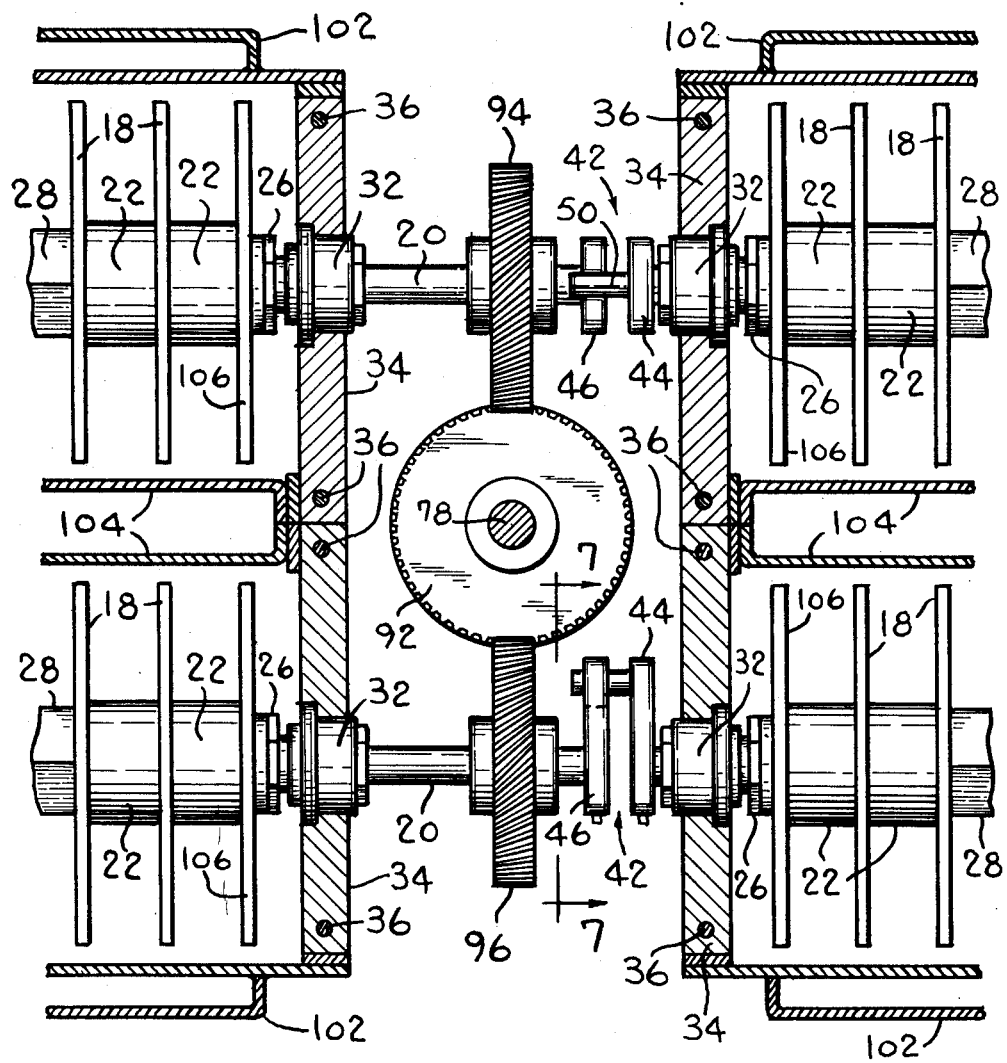
Fig. 6 is a horizontal sectional view taken along line 6—6 of Fig. 2.

As clearly shown in Fig. 6, cam shafts 20 are driven by motor 60 by means of a helical gear 92 mounted on drive shaft 78 of the motor which meshes with a pair of helical gears 94 and 96 mounted on one cam shaft 20 in each row of cam blanks 14. The entire power unit 16 including gear 92 on drive shaft 78 can be removed as a unit by simply removing screws 90 and lifting the unit out of the device. The circuits to be controlled are connected to switch banks 12 by conductors (not shown) which are brought into the device through rubber grommets 98 mounted in a plurality of openings in base 10 for connection to terminals 100 of stationary contacts 62 of the switches. The conductors are held clear of the rotating cam by means of brackets 102 and 104 mounted on opposite sides of each cam bank 14 by screws 36.

From the foregoing it will be apparent that a large number of circuits can be controlled by the four banks of cams 14. Each bank is separately mounted in a pair of mounting blocks 34 making it possible to substantially increase the number of cams in a bank from the six shown in the drawings if the application required.

An entire bank of cams and switches can be removed by simply removing one set of four screws 36. A switch bank 12 can be removed as a unit independently of other parts of the device by simply removing one set of four screws 60. Power unit 16 can be removed independently by simply removing four screws 90. Thus, it is seen that the power unit and the various cam banks and switch banks can be quickly and independently removed and replaced for repair, changing cams, etc. making the device very versatile in its operating characteristics and particularly suitable for installations where shut-downs of even relatively short duration cannot be tolerated.

Figure 5:
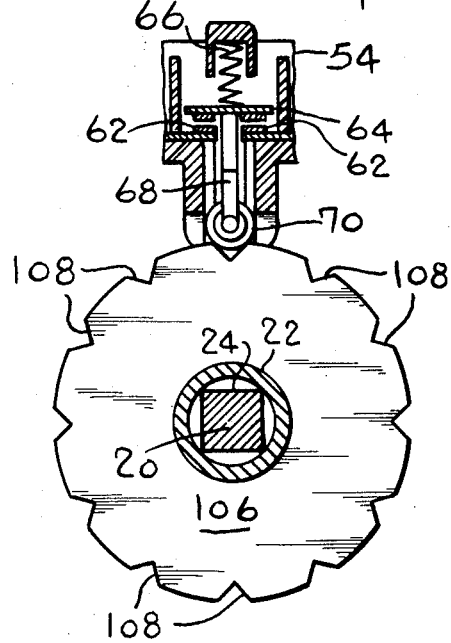
Fig. 5 is a fragmentary vertical sectional view taken along line 5—5 of Fig. 3.

In each bank of cams 14 is included an indexing cam 106 (Fig. 5) having a plurality of notches 108 in the periphery thereof. The number and spacing of notches 108 will vary with the control function required, there being a notch for each step in the process to be controlled. The particular switch mechanism actuated by these indexing cams has no circuit conductors connected to it and the notches 108 are so configured so that when rollers 70 on plungers 68 ride down in the notch the movable contactor 64 will not have reached the end of its travel resulting in a force being exerted on the cams by springs 66. To insure that the switch mechanism exerts the desired indexing force on the cam, the contacts on movable contactor 64 may be left off. Thus, the indexing cams serve to take up any play in the parts resulting from wear in the gears etc. to prevent drift and maintain accurate synchronization of the four banks of cams 14.

Although but a single embodiment of the present invention has been illustrated and described, it will be apparent to those skilled in the art that various changes and modifications may be made therein without departing from the spirit of the invention or from the scope of the appended claims.

I claim:
1. In a compact multiple-contact motor-driven switch constructed of a plurality of part units which are readily detachable for inspection and repair, in combination, a base, a plurality of cam units rigidly secured to said base and being readily detachable therefrom, each such cam unit comprising a pair of spaced mounting blocks rigidly secured to said base and being readily detachable therefrom and a cam shaft journaled in and extending between the mounting blocks of said pair thereof, said cam units being arranged in two parallel rows with at least two such cam units spaced apart in each row and the cam shafts of the cam units in each row being in axial alinement, the inner adjacent ends of such alined shafts extending toward one another through the associated mounting blocks into the space between the cam units in each row thereof, a driven gear rigidly secured to one of said alined shafts in each row in the space between the cam units in each row, a motor mounted on the inner adjacent mounting blocks of two corresponding pairs of cam units in the two rows and being readily detachable therefrom, said motor having a driving shaft and a driving gear rigidly secured to said driving shaft, said driving gear meshing with the two driven gears in the two rows, means coupling said inner adjacent ends of the alined shafts in each row to one another and being freely detachable when a cam unit is removed, a plurality of cams rigidly secured to and spaced along each cam shaft, and a contact bank unit mounted on the pair of mounting blocks of each cam unit and being readily detachable therefrom, each said contact bank unit comprising a plurality of stationary contacts and movable contacts cooperating respectively therewith for controlling electrical circuits, and spring biased actuators for said movable contacts operable by said cams in a predetermined order, the aforesaid construction permitting ready removal of the motor and driving gear mechanism or a contact bank unit or a cam unit and associated contact bank unit combination without removal of other parts.

2. The invention defined in claim 1, in which each said cam unit is provided with a disk-shaped indexing cam having equally-spaced indexing notches around the periphery thereof, the spring biased movable contact actuator associated with such indexing cam cooperating therewith to accurately position the cam unit in each of its operating positions to compensate for play between the parts of the mechanism.

3. The invention defined in claim 1, wherein each said cam unit is provided with a plurality of spacer rings around said cam shaft for spacing said cams therealong, a pair of collars threaded on said shaft for holding said cams and spacer rings tightly together, and one of said spacer rings being rigidly secured to said shaft and being provided with an outer configuration whereby it is adapted to be held against rotation by a wrench to facilitate assembly and disassembly of said cam unit.

4. The invention defined in claim 1, wherein said coupling means comprises a radial projection having a radial slot therein rigidly secured to the end of one shaft and a radial projection having a pin extending therefrom rigidly secured to the adjacent end of the other alined shaft, and said pin extending parallel to said shafts into said slot for detachably coupling said shafts to one another.

References Cited in the file of this patent
UNITED STATES PATENTS

| | | |
|---|---|---|
| 327,730 | Sims | Oct. 6, 1885 |
| 2,661,401 | Jochem et al. | Dec. 1, 1953 |
| 2,680,166 | Dietrich | June 1, 1954 |
| 2,792,459 | Danly | May 14, 1957 |
| 2,855,477 | Ullman | Oct. 7, 1958 |
| 2,861,469 | Kintzing | Nov. 25, 1958 |